US010412686B2

United States Patent
Moulsley et al.

(10) Patent No.: US 10,412,686 B2
(45) Date of Patent: *Sep. 10, 2019

(54) RADIO COMMUNICATION SYSTEM, METHOD OF OPERATING A COMMUNICATION SYSTEM, AND A MOBILE STATION

(71) Applicant: KONINKLIJKE PHILIPS N.V., Eindhoven (NL)

(72) Inventors: Timothy J. Moulsley, Caterham (GB); Matthew P. J. Baker, Canterbury (GB)

(73) Assignee: KONINKLIJKE PHILIPS N.V., Eindhoven (NL)

(*) Notice: Subject to any disclaimer, the term of this patent is extended or adjusted under 35 U.S.C. 154(b) by 164 days.

This patent is subject to a terminal disclaimer.

(21) Appl. No.: 15/055,719

(22) Filed: Feb. 29, 2016

(65) Prior Publication Data

US 2016/0183197 A1  Jun. 23, 2016

Related U.S. Application Data

(63) Continuation of application No. 14/676,153, filed on Apr. 1, 2015, now Pat. No. 9,277,507, which is a (Continued)

(51) Int. Cl.
 *H04W 52/24* (2009.01)
 *H04W 52/32* (2009.01)
 (Continued)

(52) U.S. Cl.
 CPC ......... *H04W 52/241* (2013.01); *H04W 52/20* (2013.01); *H04W 52/325* (2013.01);
 (Continued)

(58) Field of Classification Search
 CPC .......... H04W 52/241; H04W 72/0413; H04W 72/042; H04W 52/20; H04W 52/325; H04W 88/02; H04W 88/08
 (Continued)

(56) References Cited

U.S. PATENT DOCUMENTS 5,351,274 A  9/1994  Chennakeshu et al.
5,469,471 A  11/1995  Wheatey III
 (Continued)

FOREIGN PATENT DOCUMENTS

EP  1119117 A1  7/2001
EP  1432142 A1  6/2004
 (Continued)

OTHER PUBLICATIONS

UMTS Quick Reference (www.sharetechnote.com).
 (Continued)

*Primary Examiner* — Faisal Choudhury

(57) ABSTRACT

In a mobile communication system comprising a base station (100) and a plurality of mobile stations (200) and operating closed loop transmitter power control, power control commands for transmission on an uplink are derived from measurements made on received downlink signals comprising non-predetermined data values. Optionally the non-predetermined data values may comprise power control commands for uplink transmit power control.

13 Claims, 2 Drawing Sheets

Related U.S. Application Data continuation of application No. 10/554,376, filed as application No. PCT/IB2004/052347 on Nov. 9, 2004, now Pat. No. 9,185,663.

(51) Int. Cl.

| | | |
|---|---|---|
| *H04W 52/20* | (2009.01) | |
| *H04W 72/04* | (2009.01) | |
| *H04W 88/02* | (2009.01) | |
| *H04W 88/08* | (2009.01) | |

(52) U.S. Cl.
CPC ..... *H04W 72/042* (2013.01); *H04W 72/0413* (2013.01); *H04W 88/02* (2013.01); *H04W 88/08* (2013.01)

(58) Field of Classification Search
USPC .......................................................... 370/328
See application file for complete search history.

(56) References Cited

U.S. PATENT DOCUMENTS

| | | | |
|---|---|---|---|
| 6,112,104 A | 8/2000 | Saario et al. | |
| 6,173,162 B1 | 1/2001 | Dahlman et al. | |
| 6,542,756 B1 | 4/2003 | Kim | |
| 6,654,358 B1* | 11/2003 | Park | H04W 52/24 370/318 |
| 6,697,343 B1 | 2/2004 | Kamel et al. | |
| 6,728,233 B1 | 4/2004 | Park et al. | |
| 7,069,033 B1 | 7/2006 | Moon et al. | |
| 7,236,474 B2 | 6/2007 | Seo et al. | |
| 7,340,268 B2* | 3/2008 | Oh | H04W 52/40 370/320 |
| 7,353,040 B2 | 4/2008 | Baker et al. | |
| 7,392,014 B2 | 6/2008 | Baker et al. | |
| 2002/0007141 A1 | 1/2002 | Siegel et al. | |
| 2002/0061731 A1 | 5/2002 | Takano et al. | |
| 2002/0077141 A1 | 6/2002 | Hwang et al. | |
| 2002/0094833 A1 | 7/2002 | Lieshout et al. | |
| 2002/0136193 A1 | 9/2002 | Chang et al. | |
| 2003/0015327 A1 | 1/2003 | Cox et al. | |
| 2003/0036403 A1* | 2/2003 | Shiu | H04W 52/12 455/522 |
| 2003/0095516 A1 | 5/2003 | Ok et al. | |
| 2003/0096618 A1 | 5/2003 | Palenius | |
| 2003/0124983 A1 | 7/2003 | Parssinen et al. | |
| 2003/0134655 A1 | 7/2003 | Chen et al. | |
| 2003/0153272 A1 | 8/2003 | Takano | |
| 2003/0169707 A1 | 9/2003 | Usuda et al. | |
| 2004/0092233 A1 | 5/2004 | Rudrapatna | |
| 2004/0203987 A1* | 10/2004 | Butala | H04W 52/243 455/522 |
| 2004/0229572 A1 | 11/2004 | Cai et al. | |
| 2004/0266447 A1* | 12/2004 | Terry | H04W 52/08 455/450 |
| 2005/0022097 A1 | 1/2005 | Cheng | |
| 2005/0043051 A1* | 2/2005 | Takano | H04W 52/286 455/522 |
| 2005/0277422 A1 | 12/2005 | Baker et al. | |
| 2006/0189334 A1* | 8/2006 | Wakabayashi | H04W 28/14 455/500 |

FOREIGN PATENT DOCUMENTS

| | | |
|---|---|---|
| EP | 1463356 A1 | 9/2004 |
| EP | 1520360 B1 | 6/2005 |
| EP | 1658684 A1 | 5/2006 |
| EP | 1040689 B1 | 9/2013 |
| GB | 2326063 A | 12/1998 |
| JP | 07202854 A | 8/1995 |
| JP | 10135904 A | 5/1998 |
| JP | 11098032 A | 4/1999 |
| JP | 2001136123 A | 5/2001 |
| JP | 2002198899 A | 7/2002 |
| JP | 2003078484 A | 3/2003 |
| JP | 2003244071 A | 8/2003 |
| JP | 2003283423 A | 10/2003 |
| JP | 2005048483 A1 | 5/2005 |
| RU | 2127948 C1 | 3/1999 |
| RU | 2198466 C2 | 2/2003 |
| SU | 1524188 A1 | 11/1989 |
| WO | 9834356 A1 | 8/1998 |
| WO | 9849785 A1 | 11/1998 |
| WO | 2000004728 A2 | 1/2000 |
| WO | 2000004728 A3 | 1/2000 |
| WO | 2002030009 A1 | 4/2002 |
| WO | 02067461 A1 | 8/2002 |
| WO | 2003049476 A1 | 6/2003 |
| WO | 2004004173 A1 | 1/2004 |
| WO | 2005020463 A1 | 3/2005 |

OTHER PUBLICATIONS

Philips, "Slot Formats for Fractional DPCH", TDOC R1-031312, 3GPP TSG RAN WG1#35, Lisbon Portugal, Nov. 17-21, 2003, pp. 1-11.
Ipwireless, HSDPA Operation Without an Associated DPCH (TDD), TDOC R1-031067, 3GPP TSG RAN WG1#34, Seoul, Korea, Oct. 6-10, 2013, pp. 1-6.
Ipwireless, "Removal of References to 'Associated DPCH' for Release 5 TDD", TDOC R1-02-095, EGPP TSG-RAN WG1#27, Oulu, Finland, Jul. 5-2, 2002.
Samsung, "Uplink Signalling of Scheduling Informatinon", TDOC R1-031056, 3GPP TSG-RAN WG1#34, Seoul, Korea, Oct. 6-10, 2003, pp. 1-3.
Philips, "CQI Reporting in Compressed Mode", TDOC R1-031075, 3GPP TSG RAN WG1#34, Seoul, Korea, Oct. 6-10, 2003, pp. 1-5.
Nortel Networks, "An Additional Slot Structure to Support Low Bit Rate Services as a Result of the Harmonisation", TSG-RAN Working Group 1, Meeting #6(99)968, Finland, Jul. 1999.
Nortel Networks, "Fractional Dedicated Physical Channel, Discussion on Multiplexing Options", TSG-RAN Working Group 1, Meeting #34, R1-031073, Seoul, South Korea, Oct. 2003.
XP-002313526, HSDPA Operation Without an Associated DPCH (TDD), Aug. 25-29, 2003, pp. 1-6, htpp://www.quintillion.co.jp/3gpp/tsg_ran/tsg_ran2003/tsg_ran_wg1_rl1.html>.
XP-002313527, Universal Mobile Telecommunications System, Sep. 2003, pp. 1-63.
10.2.16 Handover From UTRAN Failure, Release 5, 3GPP TS 25.331 V5.5.0, Jun. 2003, pp. 333-339.
Jalali et al, "On Fast Forward Link Power Control in CDMA Systems", IEEE, Nortel Wireless, 1998, pp. 68-71.
TSG-RAN Working Group1 meeting #34, "Text proposal on fractional dedicated physical channel", R1-031074, Seoul, South Korea, Oct. 6-10, 2003, Agenda Item: 13.1.
Nortel Networks, "Fractional Dedicated Physical Channel", TSGS-RAN Working Group 1, Meeting #32, R1-030546, 2003, pp. 1-6.
"HSDPA Enhancements", 3GPP TR 25.899, version 0.2.1, 2003, release 6, 55 pages.
"HSDPA Enhancements", 3GPP TR 25.899, version 0.2.2, 2003, release 6, 55 pages.

* cited by examiner

RADIO COMMUNICATION SYSTEM, METHOD OF OPERATING A COMMUNICATION SYSTEM, AND A MOBILE STATION

The present application is a continuation of U.S. application Ser. No. 14/676,153, filed on Apr. 1, 2015, which is a continuation of U.S. application Ser. No. 10/554,376, filed on Nov. 16, 2006, which was the National Stage of International Application No. PCT/IB04/52347, filed on Nov. 9, 2004, which claims the priority of foreign application GB0326365.4 filed Nov. 12, 2003, each of which are incorporated by reference herein in their entirety.

The invention relates to a radio communication system, a method of operating a communication system, and a mobile station for use in a communication system.

In a radio communication system comprising base stations of fixed location and mobile stations, transmissions from a base station to a mobile station take place on a downlink channel and transmissions from a mobile station to a base station take place on an uplink channel. It is known to use downlink closed loop transmit power control in which a mobile station measures the quality of a received power controlled downlink pilot signal and transmits transmit power control (TPC) commands to a base station so that an adequate, but not excessive, received signal level is maintained at the mobile station despite fluctuations in downlink channel conditions. It is also known to use uplink closed loop transmit power control in which a base station measures the quality of a received uplink pilot signal and transmits transmit power control (TPC) commands to a mobile station so that an adequate, but not excessive, received signal level is maintained at the base station despite fluctuations in uplink channel conditions.

When a plurality of mobile stations share a channel, separate TPC commands are provided for each active mobile station because each mobile station will experience unique channel fluctuations. Similarly, a separate downlink pilot signal is provided for each active mobile station; each mobile station demodulates its respective pilot signal to estimate the channel characteristics prevailing for that mobile station and optionally to generate a phase reference. The estimated channel characteristics and the phase reference are then used to assist demodulating information carrying signals.

The pilot signals comprise predetermined data values to enable a mobile station readily to determine distortion introduced by the channel.

The pilot signals and the signals conveying the TPC commands are subject to transmit power control.

The transmission of the pilot signals and the TPC commands uses system resources. For example, in a Code Division Multiple Access (CDMA) system channel codes are required for the pilot signals and TPC commands, and in a Time Division Multiple Access (TDMA) system time slots are required for the pilot signals and TPC commands.

An object of the invention is to reduce the requirement for system resources.

According to a first aspect of the invention there is provided a mobile station for use in a communication system having a base station, the mobile station comprising:

receiver means for receiving from the base station a first downlink signal, measurement means for measuring a parameter of the received first downlink signal;

power control means for generating first power control commands in response to the measured parameter; and transmitter means for transmitting the first power control commands to the base station;

wherein the measurement means is adapted to measure the parameter of the first downlink signal while first downlink signal is modulated with non-predetermined data values and is subjected to transmit power control in accordance with the first power control commands.

According to a second aspect of the invention there is provided a radio communication system comprising a base station and at least one mobile station in accordance with the first aspect of the invention.

According to a third aspect of the invention there is provided a method of operating a communication system comprising a base station and at least one mobile station, comprising at the base station, receiving first power control commands transmitted by the mobile station and transmitting a first downlink signal modulated with non-predetermined data values and subjected to transmit power control in accordance with the first power control commands, and at the mobile station, receiving the first downlink signal, measuring a parameter of the first downlink signal modulated with the non-predetermined data values, generating the first power control commands in response to the measured parameter, and transmitting the first power control commands.

The invention is based on the realization that downlink closed loop power control may be operated by measuring the quality of received downlink non-predetermined data symbols instead of predetermined pilot symbols, and that in some circumstances, separate downlink pilot signals for each active mobile station are not necessary for channel estimation. In some circumstances, downlink channel estimation is not required at all, and in other circumstances a common downlink pilot signal transmitted at a constant power level may be used instead of separate pilot signals. Consequently, operation is possible using fewer downlink system resources.

Optionally, the non-predetermined data values used for measuring the quality of a received signal for downlink closed loop power control may convey downlink TPC commands used for uplink power control.

The invention will now be described, by way of example only, with reference to the accompanying drawings wherein.

Figure 1:
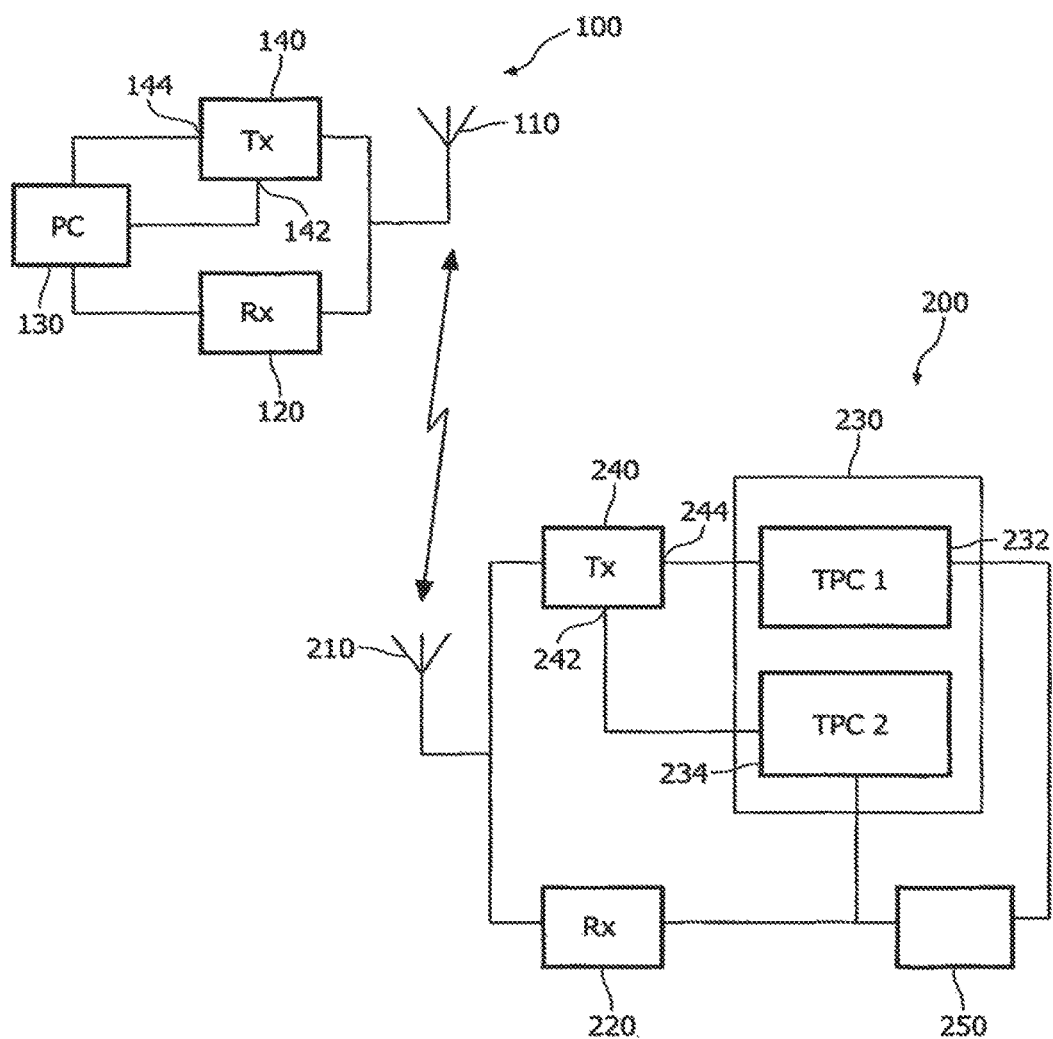
FIG. 1 is a block schematic diagram of a communication system.

One application for the invention is in the Universal Mobile Telecommunication System (UMTS). In the UMTS Frequency Division Duplex (FDD) mode, in Release 5 of the UMTS Specifications which may be viewed at http://www.3gpp.org, it is possible to operate High Speed Downlink Packet Access (HSDPA) in such a way that a downlink dedicated channel is not needed for data (user or signaling), as data can be sent via the High Speed Downlink Shared Channel (HS-DSCH). A dedicated channel uses a single channel code for exactly one user, while a shared channel allows a plurality of users to share a single channel code, either simultaneously, or in rapid time multiplex. Even though data can be sent via a shared channel, a downlink Dedicated Channel (DCH) is still required for transmitting TPC commands for each active mobile station, in order to control the uplink transmit power.

The existence of a downlink DCH requires the allocation of a channel code for the duration of the connection. One way of operating the downlink DCH is to configure it as a fractional DCH which comprises only pilot symbols and TPC commands, with multiple users multiplexed on to the same channel code in such a way that each user uses the channel code for only a fraction of each timeslot. Signaling is used to assign mobile stations to use a particular channel code and fraction of a timeslot, in order to align the uplink and downlink power control timing. Such a scheme frees up channel codes which can be used to increase system capacity. However the present invention requires even fewer resources.

The requirement is for the mobile station to be able to derive a power control command to send in the uplink. This will then be used by the base station to adjust the power of the part of the fractional DCH corresponding to that mobile station.

The invention is based on the recognition that separate pilot symbols for each active mobile station are not necessary in at least two cases:

1) Where the transmitted phase of the DCH is referenced to that of a common pilot signal, for example by using the same antenna(s) and antenna weights for both the DCH and the common pilot signal to which the phase of the DCH is referenced. In this case the characteristics of the radio channel can be estimated from the common pilot signal and this estimate can be used to demodulate the TPC bits.

This first case is very likely to apply in HSDPA, as the HS-DSCH will be assigned a common pilot signal as a reference and the same common pilot signal can be used for the fractional DCH. Since the total power used by fractional DCH's is not likely to be very large, the benefits of separate antenna beamforming for fractional DCH will not be large.

2) Where different antennas or antenna weights are used for the common pilot signal and the DCH, but the correlation between them is sufficiently good that the common pilot signal can be used to make a reasonable channel estimate for the DCH, such that the data on the DCH can be received reliably.

So, in accordance with the invention the downlink fractional DCH can consist only of non-predetermined information bits multiplexed between users. A special case of particular interest is where these information bits carry TPC commands. The amplitude of individual TPC bits may be adjusted by the base station according to power control commands received from the—relevant mobile station. The mobile station determines the radio channel phase characteristics from an appropriate common pilot signal, demodulates the TPC commands, and increases or decreases the mobile station uplink DPCCH power as required. In addition, the mobile station uses the amplitude of the received TPC bits to determine any TPC commands sent in the uplink.

FIG. 1 is a block schematic diagram of a communication system comprising a base station 100 and a mobile station 200. In practice there would be a plurality of mobile stations 200, but for clarity only a single mobile station 200 is illustrated.

The mobile station 200 comprises a receiver 220 coupled to an antenna 210 for receiving radio signals transmitted by the base station 100. Coupled to an output of the receiver 220 is a measurement means 250 for measuring a parameter of a signal received from the base station 100. The measurement means 250 is adapted to measure the parameter of a signal which is modulated with non-predetermined data and is subjected to transmit power control by the base station 100. An output of the measurement means 250 is coupled to a first input of a power control means 230. The power control means 230 comprises a generation means (TPC 1) 232 for generating first TPC commands in response to the parameter measured by the measurement means 250. A first output of the power control means 230 is coupled to a first input 244 of a transmitter 240 for transmitting the first TPC commands via the antenna 210 to the base station 100.

The base station 100 comprises a transmitter 140 and a receiver 120 coupled to an antenna 110. The receiver 120 receives radio signals transmitted by the mobile station 200, in particular the first TPC commands. An input of a power controller (PC) 130 is coupled to an output of the receiver 120 for decoding the first TPC commands received from the mobile station 200, and a first output of the power controller 130 is coupled to a first input 142 of the transmitter 140 for controlling the transmit power of the transmitter 140 in accordance with the first TPC commands.

Optionally, at the base station 100, the power controller 130 measures the quality of a signal received from the mobile station 200 and, in response to the measured quality, generates second TPC commands. A second output of the power controller 130 is coupled to a second input 144 of the transmitter 140 for transmission of the second TPC commands to the mobile station 200, to control the transmit power of the mobile station 200.

Optionally, at the mobile station 200, the power control means 230 is coupled to an output of the receiver 220 and comprises a decoding means (TPC 2) 234 for decoding the second TPC commands. A second output of the power control means 230 is coupled to a second input 242 of the transmitter 240 for controlling the transmit power of the transmitter 240 in accordance with the second TPC commands. In this case, the non-predetermined data on which the measurement means 250 makes its measurement may be the second TPC commands.

Figure 2:
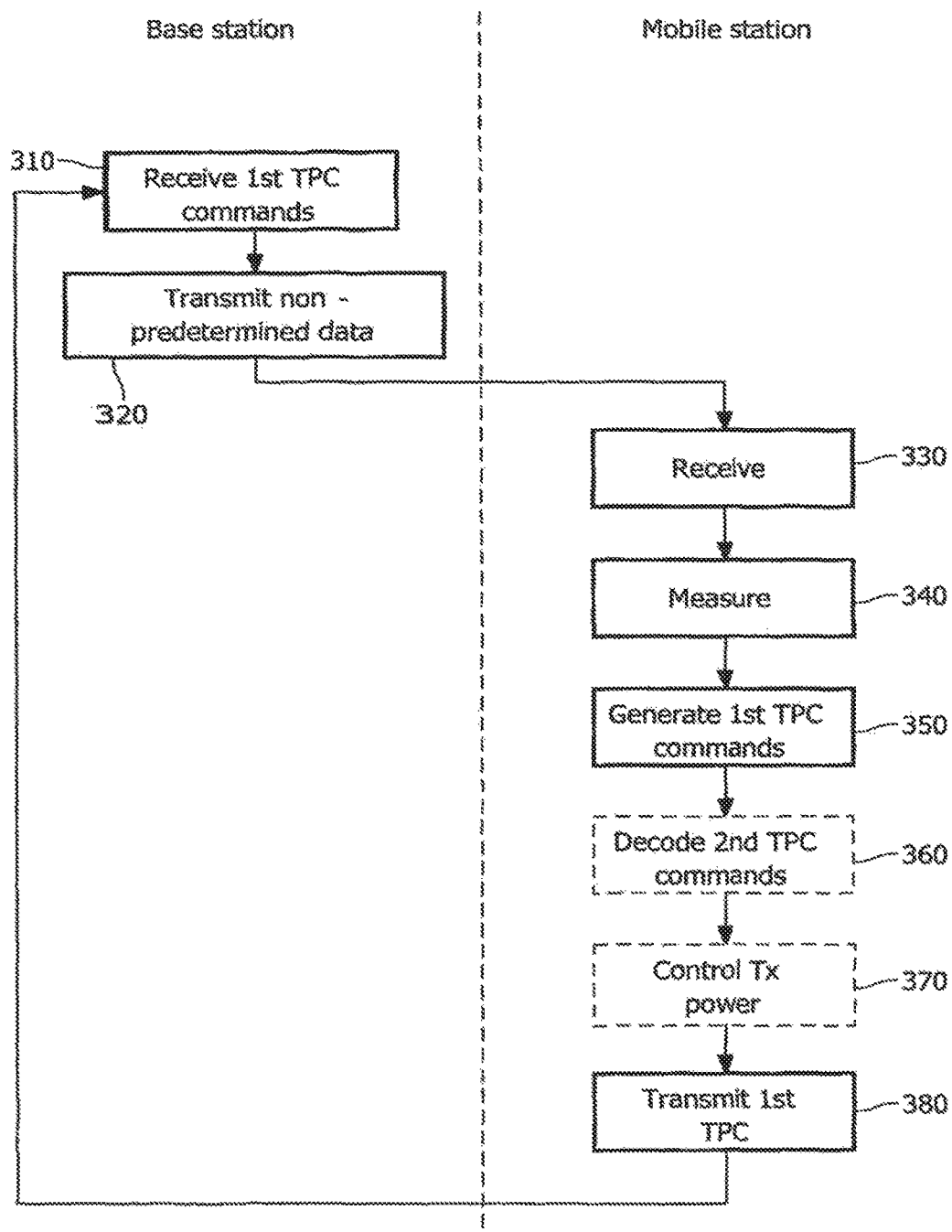
FIG. 2 is flow chart of a method of operating a communication system.

Referring to FIG. 2, steps on the left hand side of the flow chart relate to steps performed at the base station 100, and steps on the right hand side of the flow chart relate to steps performed at the mobile station 200.

At step 310 the base station 100 receives first TPC commands from the mobile station 200.

At step 320 the base station 100 transmits to the mobile station 200 a signal modulated with non-predetermined data values and subjected to transmit power control in accordance with the first TPC commands.

At step 330 the mobile station 200 receives the signal modulated with the non-predetermined data values.

At step 340 the mobile station 200 measures a parameter of the signal modulated with the non-predetermined data values.

At step 350 the mobile station 200 generates the first TPC commands in response to the measured parameter.

Optionally, at step 360, the non-predetermined data values may comprise second TPC commands and the mobile station 200 may decode the second TPC commands, and at step 370 the mobile station may control its transmit power in accordance with the second TPC commands.

At step 380 the mobile station 200 transmits the first TPC commands generated at step 350.

Flow then reverts to step 310 and the process continues to loop. The signal parameter measured by the measurement means 250 of FIG. 1, and at step 340 of FIG. 2, may be, for example, any of: signal to noise ratio; signal to interference ratio; $E_b/N_0$ (where $E_b$ is energy per bit and $N_b$ is noise density).

The decision threshold for TPC commands sent in the uplink can be determined by setting a particular error rate requirement for the TPC commands received in the downlink. This is in contrast to current practice which is to set a decision threshold in terms of the signal to noise ratio required to meet a predetermined performance target, for example a frame error rate of a data channel. One application for the invention is a fractional control channel in UMTS FDD (frequency division duplex) mode. With a spreading factor of 256 there are 10 symbols per slot. Therefore one slot can conveniently support either 2, 5 or 10 users with 5, 2 or 1 symbol per TPC command respectively.

In another application of the invention in UMTS the spreading factor would be 128, which would support the use of Space Time Transmit Diversity (STTD) applied to groups of two symbols. In this case, there are 20 symbols per slot, so 10 users can be supported while still maintaining the 2 symbols per TPC command which are required for the STTD encoding process.

Optionally, by avoiding the need to transmit a separate pilot signal for each user, the energy that would have been used to transmit the separate pilot signals may be redeployed by increasing the number of symbols used to transmit the TPC commands, thus improving the reliability of the TPC commands.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of mobile communications and which may be used instead of or in addition to features already described herein.

The invention claimed is:

1. A mobile communication device comprising:
   a radio receiver configured to receive, from a base station, a first downlink signal over a downlink fractional dedicated channel, the first downlink signal configured to carry only multiplexed uplink transmit power control commands, wherein a single uplink power control command of the multiplexed uplink power control commands is configured to be decoded by the mobile communication device; and
   a radio transmitter configured to transmit a downlink transmit power control command to the base station at a transmit power that is set based on the single decoded uplink power control command, wherein the downlink transmit power control command is configured to be utilized by the base station to adjust the power of a second downlink signal and wherein the downlink transmit power command is based on a measurement of a parameter of the first downlink signal,
   wherein the downlink fractional dedicated channel consists only of non-predetermined information bits.

2. The mobile communication station of claim 1, wherein the radio receiver is configured to receive a common downlink pilot signal from the base station; and wherein a signal analyzing circuit is configured to perform downlink channel estimation based on the received common pilot signal.

3. The mobile communication station of claim 1, wherein a transmitted phase of the downlink fractional dedicated channel is referenced to a common pilot signal.

4. The mobile communication station of claim 3, wherein different antennas are used for the common pilot signal and the downlink fractional dedicated channel.

5. The mobile communication station of claim 3, wherein different antenna weights are used for the common pilot signal and the downlink fractional dedicated channel.

6. The mobile communication station of claim 1, further comprising a control circuit configured to measure the parameter of the first downlink signal and generate the downlink power control command.

7. The mobile communication station of claim 6, wherein the control circuit is configured to measure an error rate of the uplink transmit power control commands, and send the downlink transmit power control commands, when the measured error rate exceeds a predetermined threshold.

8. The mobile communication station of claim 1, further comprising a control circuit configured to decode the single uplink power control command of the multiplexed uplink power control commands.

9. The mobile communication station of claim 1, wherein the downlink fractional dedicated channel includes a plurality of slots carrying a portion of the multiplexed non-predetermined data values, each slot of said plurality of slots being configured to communicate non-predetermined data values for a different respective mobile station in the communication system.

10. A communication base station comprising;
    a radio transmitter configured to transmit a first downlink signal to a mobile station over a downlink fractional dedicated channel, the first downlink signal configured to carry only multiplexed uplink transmit power control commands that are encoded in a plurality of slots of the fractional dedicated channel, said plurality of slots each including uplink transmit power control commands for a plurality of mobile stations;
    a radio receiver configured to receive a downlink transmit power control command from the mobile station, and
    wherein the radio transmitter is configured to transmit a second downlink signal at a transmit power that is based on the received downlink transmit power control command,
    wherein the downlink fractional dedicated channel consists only of non-predetermined information bits.

11. The communication base station of claim 10, wherein the radio transmitter is further configured to transmit, using the radio transmitter, a common downlink pilot signal to the mobile station so as to enable the mobile station to perform downlink channel estimation based on the common pilot signal.

12. The communication base station of claim 10, wherein the fractional dedicated channel includes the plurality of slots carrying the multiplexed uplink transmit power control commands, each slot of said plurality of slots being configured to communicate an uplink transmit power control command for a different mobile station.

13. The communication base station of claim 10, further comprising a control circuit configured to generate the plurality of uplink transmit power control commands and encode the plurality of uplink transmit power control commands in the plurality of slots.

* * * * *